(12) United States Patent
Werner et al.

(10) Patent No.: US 11,356,428 B2
(45) Date of Patent: Jun. 7, 2022

(54) DATA SECURITY METHOD FOR PRIVACY PROTECTION

(71) Applicant: Google LLC, Mountain View, CA (US)

(72) Inventors: Margo Werner, San Francisco, CA (US); Philip Mcdonnell, Belmont, CA (US); Yongle Cao, Fremont, CA (US); Eugen Cristian Nistor, Los Altos, CA (US); Shreenath Regunathan, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 227 days.

(21) Appl. No.: 16/759,511

(22) PCT Filed: Aug. 14, 2019

(86) PCT No.: PCT/US2019/046533
§ 371 (c)(1),
(2) Date: Apr. 27, 2020

(87) PCT Pub. No.: WO2021/029888
PCT Pub. Date: Feb. 18, 2021

(65) Prior Publication Data
US 2021/0406950 A1     Dec. 30, 2021

(51) Int. Cl.
*H04L 29/06* (2006.01)
*H04L 9/40* (2022.01)
(Continued)

(52) U.S. Cl.
CPC ........ *H04L 63/045* (2013.01); *G06F 21/6254* (2013.01); *G06Q 30/0244* (2013.01);
(Continued)

(58) Field of Classification Search
CPC ................. G06F 21/602; G06F 21/606; G06F 21/6245–6263; G06Q 30/0244;
(Continued)

(56) References Cited

U.S. PATENT DOCUMENTS

2011/0231243 A1   9/2011   Bhatia et al.
2015/0326547 A1   11/2015  Carlson
2015/0356597 A1   12/2015  Saxena et al.

FOREIGN PATENT DOCUMENTS

WO   WO-2016063092 A1 *  4/2016   ............. G06F 21/62
WO   WO-2017004688 A1 *  1/2017   ........... G06Q 20/325
(Continued)

OTHER PUBLICATIONS

International Search Report and The Written Opinion of the International Searching Authority regarding PCT/US2019/046533 dated Apr. 9, 2020.
(Continued)

*Primary Examiner* — Kevin Bechtel
(74) *Attorney, Agent, or Firm* — Marshall, Gerstein & Borun LLP

(57) ABSTRACT

A method including receiving, at a first computing system from a second computing system, a first key and encrypted online interaction data, receiving, at the first computing system from a third computing system, a second key and encrypted offline action data encoding data indicating one or more offline actions, receiving, at the first computing system from the third computing system, executable code comprising a third key, and executing, by the first computing system, the executable code. The executable code causing the first computing system to decrypt the encrypted online interaction data and the encrypted offline action data using the first key, the second key, and the third key, correlate one or more of the offline actions in the offline action data to one or more online interactions in the online interaction data, and gen-
(Continued)

erate aggregate data indicating a number of offline actions correlated to the online interactions.

18 Claims, 7 Drawing Sheets

(51) Int. Cl.
*G06F 21/62* (2013.01)
*G06Q 30/02* (2012.01)

(52) U.S. Cl.
CPC ..... *G06Q 30/0246* (2013.01); *G06Q 30/0254* (2013.01); *H04L 63/0435* (2013.01)

(58) Field of Classification Search
CPC ............ G06Q 30/0246; G06Q 30/0254; H04L 63/0428–045
See application file for complete search history.

(56) References Cited

FOREIGN PATENT DOCUMENTS

| | | | | |
|---|---|---|---|---|
| WO | WO-2017055879 A1 * | 4/2017 | ............. | G06F 16/60 |
| WO | WO-2019040874 A1 * | 2/2019 | ........... | G06F 16/137 |

OTHER PUBLICATIONS

International Search Report and Written Opinion for PCT Appln. Ser. No. PCT/US2020/045915 dated Oct. 13, 2020 (18 pages).

* cited by examiner

DATA SECURITY METHOD FOR PRIVACY PROTECTION

CROSS-REFERENCE TO RELATED APPLICATIONS

The present application is a National Stage Application, filed under 35 U.S.C. 371, of International Patent Application No. PCT/US2019/046533 filed on Aug. 14, 2019 titled "DATA SECURITY METHOD FOR PRIVACY PROTECTION," the entirety of which is incorporated by reference herein.

BACKGROUND

In a computer networked environment such as the Internet, entities such as people interact with information such as content items within a webpage. In an offline environment such as a retail location, the entities may perform actions such as making a phone call or purchase. There is a need to identify how the online interactions may relate to the offline actions in a secure way and while protecting the privacy of personally identifiable information.

SUMMARY

One implementation of the disclosure relates to a method including receiving, at a first computing system from a second computing system, a first key and encrypted online interaction data encoding data indicating one or more online interactions with content, receiving, at the first computing system from a third computing system, a second key and encrypted offline action data encoding data indicating one or more offline actions, receiving, at the first computing system from the third computing system, executable code comprising a third key, and executing, by the first computing system, the executable code. The executable code causing the first computing system to decrypt the encrypted online interaction data and the encrypted offline action data using the first key, the second key, and the third key, correlate one or more of the offline actions in the offline action data to one or more online interactions in the online interaction data, and generate aggregate data indicating a number of offline actions correlated to the online interactions.

In some implementations, the first computing system transmits the aggregate data to at least one of the second computing system or the third computing system without providing the decrypted online interaction data to the third computing system or the decrypted offline action data to the second computing system. In some implementations, the encrypted online interaction data includes a first identifier for each of the one or more online interactions, the encrypted offline action data includes a second identifier for each of the one or more offline actions, and correlating the offline actions to the online interactions includes determining one or more of the second identifiers associated with one or more of the first identifiers. In some implementations, the first computing system receives from a fourth computing system, mapping data associating one or more of the first identifiers with one or more of the second identifiers. In some implementations, correlating the offline actions to the online interactions includes determining the one or more of the second identifiers associated with the one or more of the first identifiers using the mapping data.

In some implementations, the executable code is executed within a protected environment of the first computing system and the decrypted online interaction data and the decrypted offline action data is stored within the protected environment such that the decrypted online interaction data and the decrypted offline action data is inaccessible to a portion of the first computing system outside of the protected environment. In some implementations, the first key and the second key are shared keys and the third key is a private key, wherein the encrypted online interaction data and the encrypted offline action data are encrypted by symmetric encryption using the shared keys, and wherein the first key and the second key are encrypted by asymmetric encryption using the third key. In some implementations, generating the aggregate data using the executable code allows the third computing system to control characteristics of the aggregate data without exposing unencrypted action data to the third computing system. In some implementations, the one or more offline actions are offline transactions at one or more physical storefronts. In some implementations, the first computing system is a cloud cluster processing system.

Another implementation relates to a first computing system including a memory having instructions stored thereon and a processor configured to execute the instructions. The instructions causing the processor to receive, from a second computing system, a first key and encrypted online interaction data encoding data indicating one or more online interactions with content, receive, from a third computing system, a second key, encrypted offline action data encoding data indicating one or more offline actions, and executable code, and execute the executable code. The executable code causing the processor to decrypt the encrypted online interaction data received from the first computing system, decrypt the encrypted offline action data received from the second computing system, correlate one or more of the offline actions in the offline action data to one or more online interactions in the online interaction data, and generate aggregate data indicating a number of offline actions correlated to the online interactions.

In some implementations, the instructions further causing the processor to transmit the aggregate data to at least one of the first computing system or the second computing system without providing the decrypted online interaction data to the second computing system or the decrypted offline action data to the first computing system. In some implementations, the encrypted online interaction data include a first identifier for each of the one or more online interactions, the encrypted offline action data include a second identifier for each of the one or more offline actions, and wherein correlating the offline actions to the online interactions include determining one or more of the second identifiers associated with one or more of the first identifiers. In some implementations, the system further includes a fourth computing system having mapping data, and wherein the third computing system correlates the offline actions to the online interactions by determining the one or more of the second identifiers associated with the one or more of the first identifiers using the mapping data.

In some implementations, the third computing system further includes a protected environment and wherein the decrypted online interaction data and the decrypted offline action data are stored within the protected environment such that the decrypted online interaction data and the decrypted offline action data are inaccessible to a portion of the third computing system outside of the protected environment. In some implementations, the first key and the second key are shared keys and the third key is a private key, wherein the encrypted online interaction data and the encrypted offline action data are encrypted by symmetric encryption using the shared keys, and wherein the first key and the second key are encrypted by asymmetric encryption using the third key. In some implementations, generating the aggregate data using the executable code allows the second computing system to control characteristics of the aggregate data without exposing unencrypted action data to the second computing system. In some implementations, the one or more offline actions are offline transactions at one or more physical storefronts.

Another implementation relates to a method including receiving, at a first computing system from a second computing system, a first key and encrypted online interaction data encoding data indicating one or more online interactions with content, the encrypted online interaction data including a first identifier for each of the one or more online interactions, receiving, at the first computing system from a third computing system, a second key and encrypted offline action data encoding data indicating one or more offline actions, the encrypted offline action data including a second identifier for each of the one or more offline actions, receiving, at the first computing system from the third computing system, executable code including a third key, receiving, at the first computing system from a fourth computing system, mapping data associating one or more of the first identifiers with one or more of the second identifiers, and executing, by the first computing system, the executable code. The executable code causing the first computing system to decrypt the encrypted online interaction data and the encrypted offline action data using the first key, the second key, and the third key, correlate one or more of the offline actions in the offline action data to one or more online interactions in the online interaction data by determining the one or more of the second identifiers associated with the one or more of the first identifiers using the mapping data, generate aggregate data indicating a number of offline actions correlated to the online interactions, and transmit the aggregate data to at least one of the second computing system or the third computing system without providing the decrypted online interaction data to the third computing system or the decrypted offline action data to the second computing system.

In some implementations, the one or more offline actions are offline transactions at one or more physical storefronts. In some implementations, the first computing system is a cloud cluster processing system.

The various aspects and implementations may be combined where appropriate.

DETAILED DESCRIPTION

Figure 1:
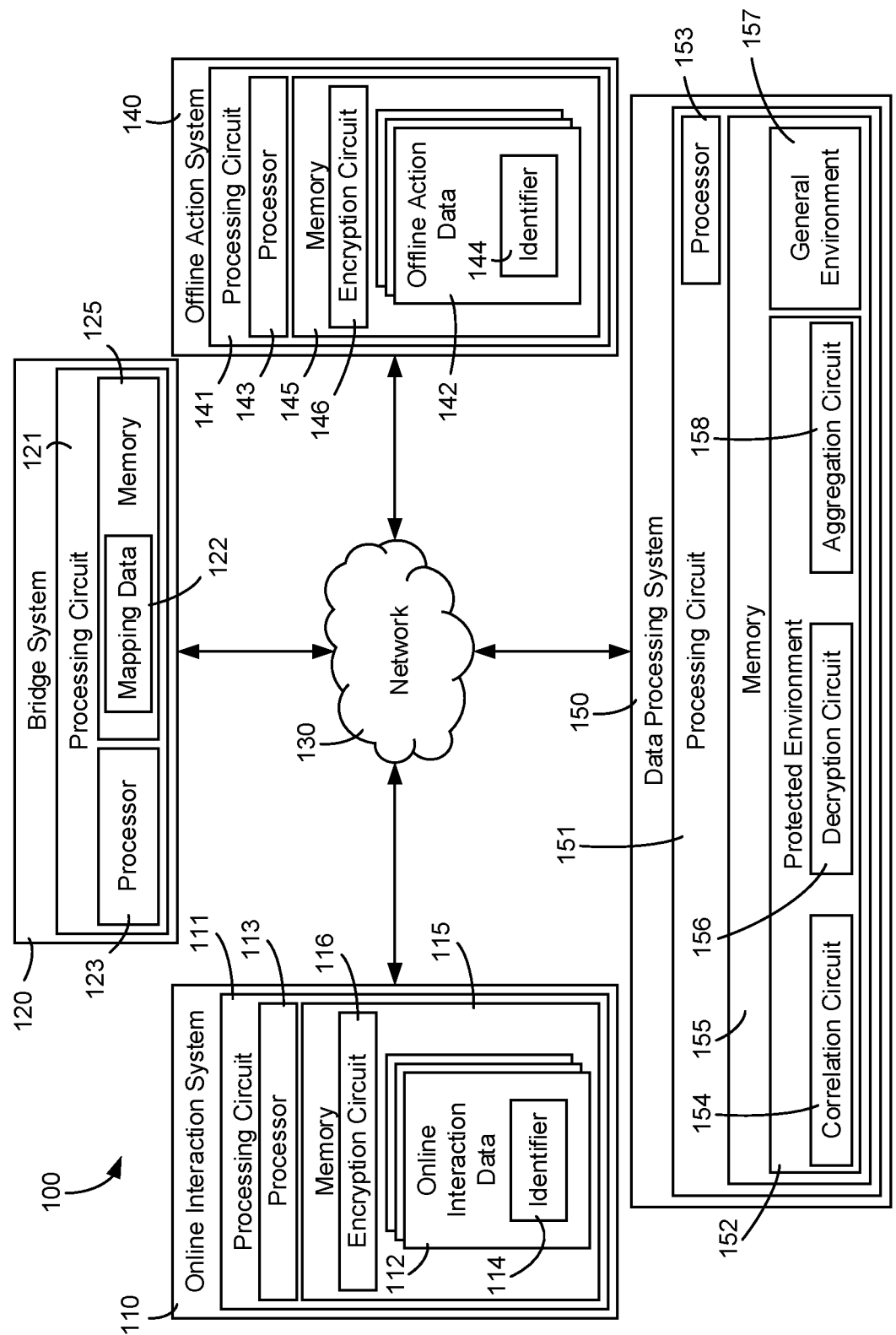
FIG. 1 is a diagram illustrating various entities interacting over a network, according to an illustrative implementation.
Figure 2:
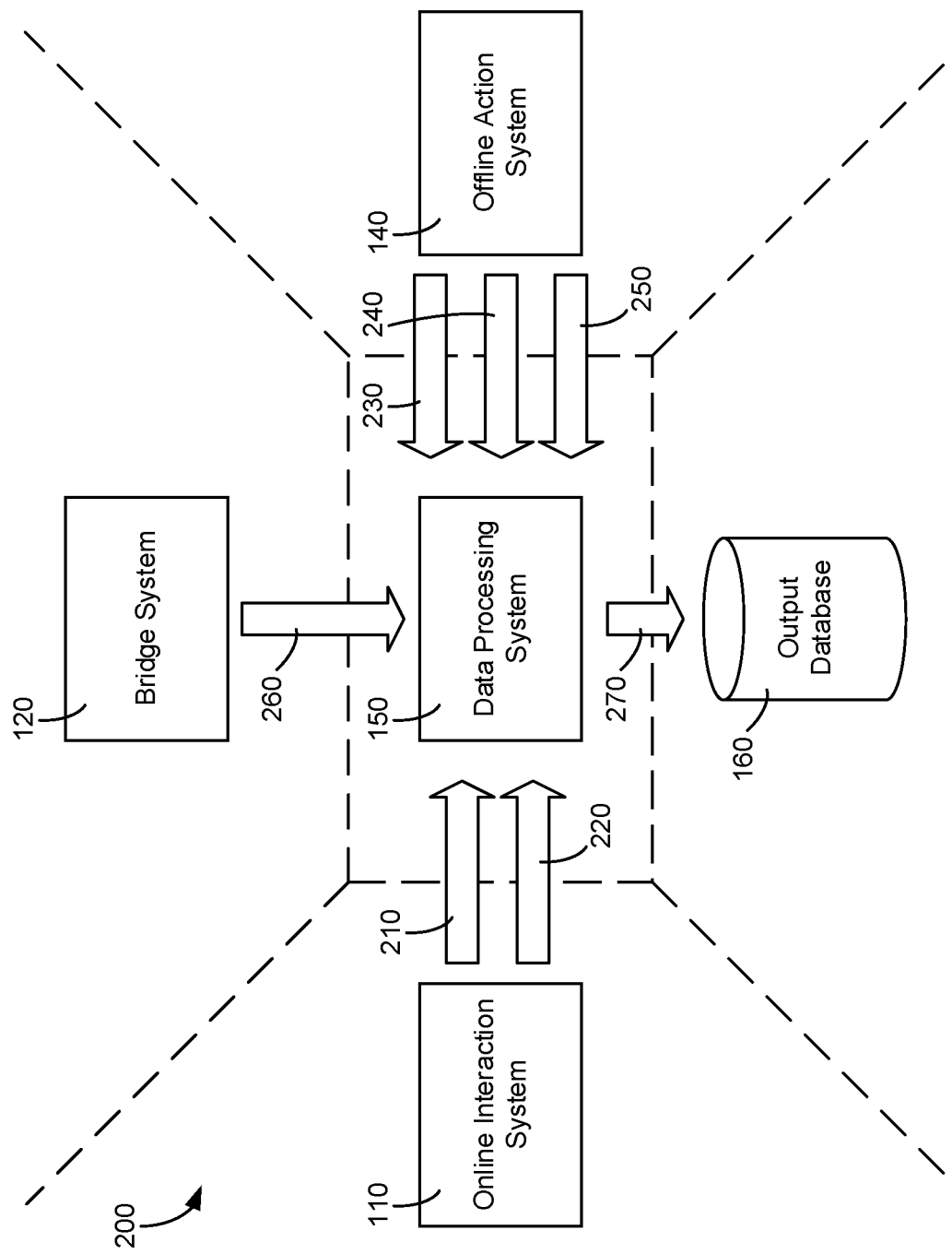
FIG. 2 is a diagram illustrating data transfer between the various entities of FIG. 1, according to an illustrative implementation.

Following below are more detailed descriptions of various concepts related to, and implementations of, methods, apparatuses, and systems for correlating online interactions with offline actions in a privacy conscious manner. The various concepts introduced above and discussed in greater detail below may be implemented in any of numerous ways, as the described concepts are not limited to any particular manner of implementation.

Systems and methods of the present disclosure relate generally to supplying a content provider with information about offline actions related to online content produced by the content provider in a secure way. For example, a computing device such as a personal computer, smartphone, or tablet may visit a web page (or other online document) maintained by a content publisher. The content publisher may include content items, such as advertisements, produced by the content provider. A first data processing system associated with the content provider may identify online interactions with the online content and send first identifiers associated with the online interactions to a second data processing system. The second data processing system may receive second identifiers associated with offline actions.

The second data processing system may receive mapping data that associates individual identifiers of the first identifiers with individual identifiers of the second identifiers. Using the linked identifiers, the second data processing system may determine which online interactions resulted in an offline action (e.g., a visit to a retail location, an offline purchase, a phone call, etc.). The second data processing system may thus supply the content provider with additional information regarding the effectiveness of online content in generating offline actions. The second data processing system may also provide more detailed information regarding the offline action, including whether a purchase occurred, what item, if any, was purchased, and a price of the item.

More specifically, systems and methods of the present disclosure relate to a unique cryptography and computer architecture methodology to correlate data from different entities in a more secure way. Typically, correlating data from different entities requires a computing system to have access to data from each entity. However, when joined together, the data may reveal personally identifiable information ("PII") (e.g., credit card numbers, social security numbers, addresses, etc.) about the individuals associated the data. It is undesirable to reveal PII. Therefore, there is a need for a unique cryptography and computer architecture methodology to correlate data from different entities in a more secure way. Aspects of the present disclosure provide an improved encryption method. The encryption method may be used to correlate users' online interactions and offline actions in a secure way, by providing increased security and also conserving user privacy.

To ensure the privacy and security of PII, systems and methods of the present disclosure isolate data ownership to prevent entities (e.g., a content provider, a third party, etc.) from receiving unencrypted PII to which they would not otherwise have access. For example, a third data processing system associated with a third party providing the second identifiers may produce a public key for asymmetric encryption. The first data processing system may encrypt the first identifiers at least partially using the public key before sending the first identifiers to the second data processing system. Similarly, the third data processing system may encrypt the second identifiers at least partially using the public key before sending the second identifiers to the second data processing system. The second data processing system may be configured to be inaccessible to all entities such that the first and third data processing systems may send data (e.g., the encrypted first and second identifiers) to the second data processing system but may not access any of the data within the second data processing system. The second data processing system may receive, from the third data processing system, executable code (e.g., a binary, etc.) including a private key corresponding to the public key to decrypt the first and second identifiers. Therefore, the second data processing system may facilitate independent matching of the first and second identifiers without revealing PII.

Referring now to FIG. 1, a system 100 for securely correlating data from different entities is shown, according to an illustrative implementation. System 100 includes online interaction system 110, bridge system 120, offline action system 140, and data processing system 150. In some implementations, components of system 100 communicate over network 130. Network 130 may include computer networks such as the Internet, local, wide, metro or other area networks, intranets, satellite networks, other computer networks such as voice or data mobile phone communication networks, combinations thereof, or any other type of electronic communications network. Network 130 may include or constitute a display network (e.g., a subset of information resources available on the Internet that are associated with a content placement or search engine results system, or that are eligible to include third party content items as part of a content item placement campaign).

In some implementations, online interaction system 110 is a source of online interaction data 112 associated with a content provider (e.g., an online advertiser). In some implementations, online interaction data 112 indicates an interaction with content items such as marketing items (e.g., advertisements). Online interaction system 110 may send online interaction data 112 to data processing system 150. Online interaction system 110 may receive online interaction data 112 from personal computers, servers, mobile computing devices, or other computing devices associated with a content provider. For example, the content provider may generate online interaction data 112 from a web-based content item displayed on a web page or other online document. The primary content of the online document may include content other than that provided by the content provider, and the online document may include content slots configured for the display of the provided content items. For example, a content publisher may operate the website of a company and may provide content about that company for display on web pages of the website. The web pages may include content slots configured for the display of the provided content items.

In some implementations, online interaction data 112 provided by online interaction system 110 describes a number or grouping of online interactions (e.g., interactions with a number of content items). Additionally or alternatively, online interaction data 112 may describe an individual online interaction (e.g., a single interaction with a single content item). Online interaction data 112 may include a unique identifier ("ID") 114. In some implementations, identifier 114 identifies an individual associated with the online interaction. Additionally or alternatively, identifier 114 may uniquely identify each online interaction. In some implementations, online interaction data 112 describes one or more actions associated with content items. For example, online interaction data 112 may include a time, date, and/or location of online interactions. The online interactions described by online interaction data 112 may include viewing a content item (e.g., navigating to a webpage in which a content item is presented and/or determining that the item or a portion of the item is presented within a viewport of the device upon which the webpage is viewed, etc.), selecting/clicking a content item, hovering over a content item, and/or other interactions with a content item.

In some implementations, online interaction system 110 includes processing circuit 111 having processor 113 and memory 115. Memory 115 may store machine instructions that, when executed by processor 113 cause processor 113 to perform one or more of the operations described herein. The operations described herein may be implemented using software, hardware, or a combination thereof. Processor 113 may include a microprocessor, ASIC, FPGA, etc., or combinations thereof. In many implementations, processor 113 may be a multi-core processor or an array of processors. Memory 115 may include, but is not limited to, electronic, optical, magnetic, or any other storage devices capable of providing processor 113 with program instructions. Memory 115 may include a floppy disk, CD-ROM, DVD, magnetic disk, memory chip, ROM, RAM, EEPROM, EPROM, flash memory, optical media, or any other suitable memory from which processor 113 can read instructions. The instructions may include code from any suitable computer programming language such as, but not limited to, C, C++, C#, Java, JavaScript, Perl, HTML, XML, Python and Visual Basic. In some implementations, memory 115 includes encryption circuit 116 and online interaction data 112. Encryption circuit 116 may facilitate the secure transfer of online interaction data 112. Encryption circuit 116 may encrypt online interaction data 112. Encryption circuit 116 may encrypt online interaction data 112 via symmetric encryption, asymmetric encryption, and/or a combination thereof. Encryption is discussed in more detail below with reference to FIGS. 3 and 4.

Offline action system 140 may provide offline action data 142 associated with one or more offline actions to data processing system 150. Offline action data 142 may be associated with any action outside the online network via which the online interactions occur. For example, offline action data 142 may describe physical actions, purchases, actions carried out over a telephone network, and/or transactions. In some implementations, offline action system 140 is associated with a third party. For example, the third party may be a loyalty card provider. In some implementations, offline action system 140 includes processing circuit 141 having processor 143 and memory 145. Processor 143 and memory 145 may have any of the characteristics as described above in reference to processor 113 and memory 115. Memory 145 may include encryption circuit 146 and/or offline action data 142. Encryption circuit 146 may facilitate the secure transfer of offline action data 142. Offline action data 142 may describe one or more offline actions associated with one or more individuals. In some implementations, offline action data 142 is associated with a unique identifier 144. Identifier 144 may identify an individual associated with the offline action. Additionally or alternatively, identifier 144 may uniquely identify each offline action. In some implementations, offline action data 142 includes a time, date, location, and/or other information regarding the offline action. For example, if the offline action is a transaction, offline action data 142 may include the type of transaction, the item purchased, if any, and the price of the item. While the present disclosure discusses correlating online interactions with offline actions, it should be understood that the concepts discussed herein could equally be used to correlate online interactions with other types of online activities performed via network 130 and/or via another electronic communications network, rather than or in addition to offline actions outside of the online network via which the online actions occur. All such implementations are contemplated within the scope of the present disclosure.

In some implementations, bridge system 120 is a source of mapping data 122 that facilitates correlating the online interaction data and the offline action data. Bridge system is shown to include processing circuit 121 having processor 123 and memory 125. Processor 123 and memory 125 may have any of the characteristics as described above in reference to processor 113 and memory 115. Bridge system 120 may be or may be associated with a provider of identity mapping information. The identity mapping information provider may have offline data that is transferred online to facilitate identity resolution. In some implementations, mapping data 122 translates a first unique ID associated with online interaction system 110 and a second unique ID associated with offline action system 140 to a common bridge ID, thereby providing a way of correlating the separate IDs without exposing the IDs to the other entity. In some implementations, bridge system 120 sends mapping data 122 (e.g., a lookup table, etc.) to data processing system 150. Additionally or alternatively, data processing system 150 may query bridge system 120. For example, data processing system 150 may query bridge system 120 with identifier 114 to receive the corresponding identifier 144. In some implementations, bridge system 120 is queried by online interaction system 110 and/or offline action system 140.

Data processing system 150 facilitates a privacy conscious method of correlating data from different entities. In some implementations, data processing system 150 may correlate online interaction data 112 to offline action data 142. Data processing system 150 may be a server, distributed processing cluster, cloud processing system, or any other computing device. Data processing system 150 may include or execute at least one computer program or at least one script. In some implementations, data processing system 150 includes combinations of software and hardware, such as one or more processors configured to execute one or more scripts.

Data processing system 150 may include processing circuit 151 having processor 153 and memory 155. Processor 153 and memory 155 may have any of the characteristics as described above in reference to processor 113 and memory 115. Memory 155 may include general environment 157 and protected environment 152. General environment 157 may be isolated from protected environment 152 such that protected environment 152 is inaccessible to general environment 157. Protected environment 152 may be an access restricted system as described in greater detail below with reference to FIG. 6. In some implementations, protected environment 152 includes correlation circuit 154, decryption circuit 156, and/or aggregation circuit 158. In some implementations, protected environment 152 and/or data processing system 150 includes a different number, type, and/or combination of components.

Correlation circuit 154 may correlate data from different entities. In some implementations, correlation circuit 154 may correlate online interaction data 112 to offline action data 142 using mapping data 122. For example, correlation circuit 154 may receive online interaction data 112 and send identifier 114 associated with the online interaction to bridge system 120 to receive identifier 144 associated with the offline action corresponding to the offline action data 142 correlated to online interaction data 112. Correlation of data from different entities is described in detail below with reference to FIG. 5.

Decryption circuit 156 may decrypt data from different entities. In some implementations, decryption circuit 156 decrypts data received from online interaction system 110 and/or offline action system 140 (e.g., online interaction data 112, offline action data 142). Decryption circuit 156 may receive and/or include one or more secrets (e.g., keys, codes, etc.) to facilitate decryption of data from different entities. Decryption is described in greater detail below with reference to FIGS. 4 and 5. Aggregation circuit 158 may aggregate data to facilitate insights into the correlation of the online interactions with the offline actions while protecting the underlying PII. In some implementations, aggregation circuit 158 may aggregate data from correlation circuit 154. Aggregation is discussed in more detail below with reference to FIG. 5.

Referring now to FIGS. 2-5, improved cryptography and computer architecture for correlating data from different entities is shown, according to an illustrative implementation. Correlated data may be sent as aggregate output data to output database 160. In some implementations, output database 160 receives data from data processing system 150. In some implementations, output database 160 is a server, database, or other network connected data repository.

Online interaction system 110 may send (210) data processing system 150 encrypted online interaction data 414. In various implementations, online interaction system 110 encrypts online interaction data 112 prior to sending (e.g., via encryption circuit 116). Encrypted online interaction data 414 may only be decrypted by data processing system 150. Therefore, because outside entities cannot decrypt encrypted online interaction data 414, PII security is maintained. Online interaction system 110 may send (220) data processing system 150 a first key, shown as encrypted first session key 416, to facilitate decryption of encrypted online interaction data 414. The first key may be encrypted. In some implementations, online interaction system 110 used the first key to encrypt online interaction data 112 prior to sending. Data processing system 150 may use the first key in decrypting encrypted online interaction data 414.

Offline action system 140 may send (230) data processing system 150 encrypted offline action data 444. In various implementations, offline action system 140 encrypts offline action data 142 prior to sending. Similar to encrypted online interaction data 414, encrypted offline action data 444 may only be decrypted by data processing system 150. Offline action system 140 may send (240) data processing system 150 a second key, shown as encrypted second session key 446, to facilitate decryption of encrypted offline action data 444. The second key may be encrypted. In some implementations, offline action system 140 used the second key to encrypt offline action data 142 prior to sending. Data processing system 150 may use the second key in decrypting encrypted offline action data 444. Offline action system 140 may send (250) data processing system 150 executable code 250 to decrypt encrypted online interaction data 414 and encrypted offline action data 444. In some implementations, executable code 250 includes a third key. Executable code 250 may include machine executable instructions (e.g., a binary code file, etc.) to decrypt encrypted online interaction data 414 and encrypted offline action data 444, match the decrypted online interaction data 112 and offline action data 142, and produce aggregate output data. In some implementations, executable code 250 decrypts the first and second keys as part of decrypting encrypted online interaction data 414 and encrypted offline action data 444. Executable code 250 may be secure such that it cannot be used to recover the third key.

Bridge system 120 may send (260) mapping data 122 to data processing system 150. In some implementations, data processing system 150 queries bridge system 120 to match online interaction data 112 to offline action data 142. Data processing system 150 may send (270) aggregate output data to output database 160. The aggregate output data may include a sum of conversions (e.g., transactions, clicks, phone calls, etc.), a sum of the value associated with each conversion (e.g., a dollar amount), and metadata. The metadata may include an indication of variance, average, and/or any other statistical measures. Offline action system 140 may change the output of the aggregate output data via executable code 250. For example, offline action system 140 may provide first executable code that produces aggregate output data including an average value associated with each conversion and may provide second executable code that produces aggregate output data including a maximum value associated with conversions in the third quartile of conversion values.

Figure 3:
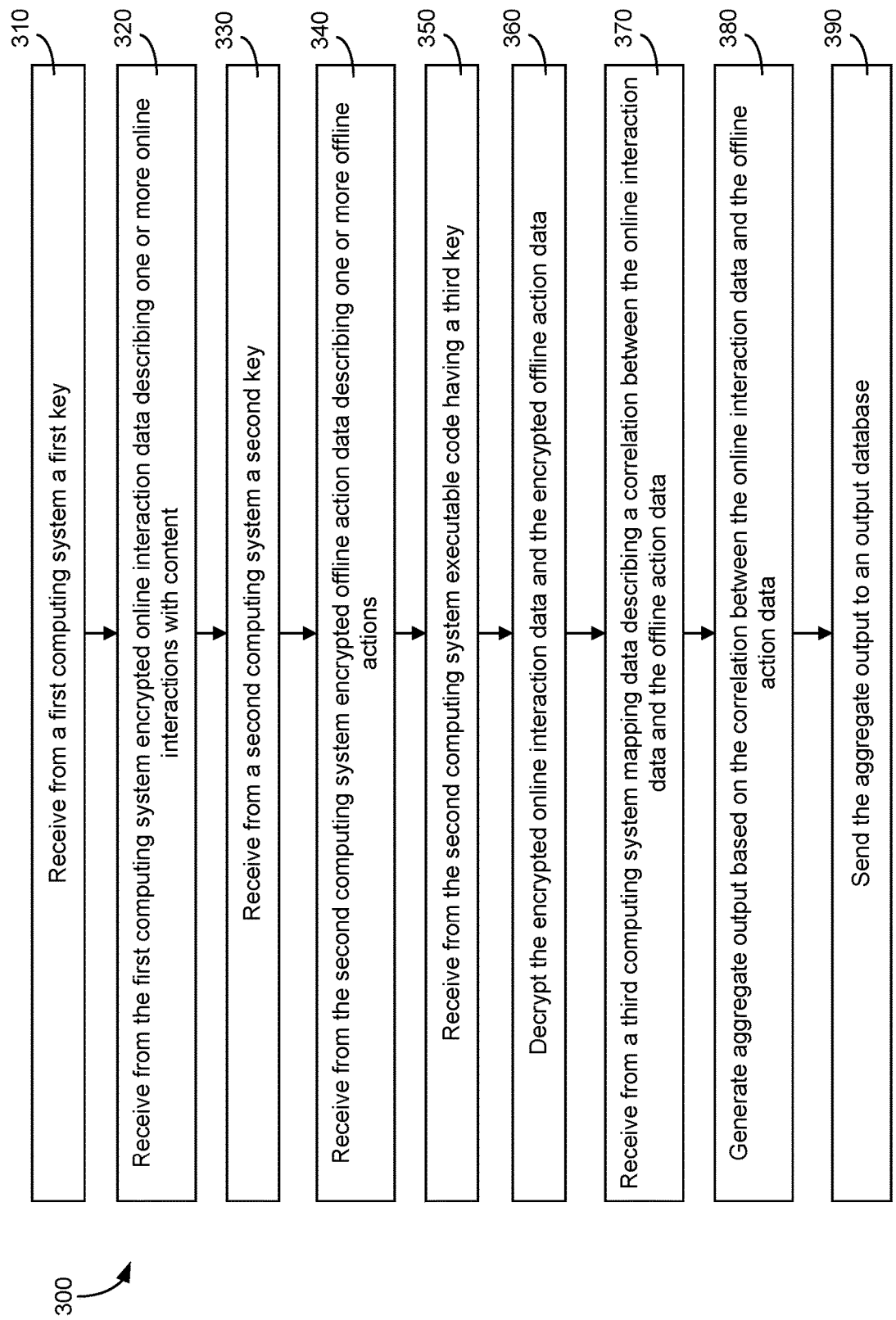
FIG. 3 is a flow diagram illustrating a method of securely associating online interaction data with offline action data, according to an illustrative implementation.

Referring now specifically to FIG. 3, a flow diagram illustrating a method 300 of securely associating online interaction data with offline action data is shown, according to an illustrative implementation. Method 300 may be implemented by data processing system 150. While method 300 is described in reference to data processing system 150, it should be understood that method 300 may be implemented by any computing device independent of online interaction system 110 and offline action system 140 that maintains PII anonymity and security.

At step 310, data processing system 150 may receive from a first computing system a first key. The first computing system may be online interaction system 110. In some implementations, the first key is encrypted (e.g., encrypted first session key 416). At step 320, data processing system 150 may receive from the first computing system encrypted online interaction data 414 describing one or more online interactions associated with one or more individuals. In some implementations, the first key is used to encrypt online interaction data 112 to produce encrypted online interaction data 414. At step 330, data processing system 150 may receive from a second computing system a second key. The second computing system may be offline action system 140. In some implementations, the second key is encrypted (e.g., encrypted second session key 446). At step 340, data processing system 150 may receive from the second computing system encrypted offline action data 444 describing one or more transactions associated with one or more individuals. In some implementations, the second key is used to encrypt offline action data 142 to produce encrypted offline action data 444.

At step 350, data processing system 150 may receive from the second computing system executable code 250 having a third key. In some implementations, the third key is an asymmetric encryption private key. At step 360, data processing system 150 may decrypt encrypted online interaction data 414 and encrypted offline action data 444. In some implementations, data processing system 150 decrypts encrypted online interaction data 414 and encrypted offline action data 444 based on instructions included in executable code 250. Data processing system 150 may use the first key, the second key, and/or the third key to decrypt encrypted online interaction data 414 and encrypted offline action data 444. At step 370, data processing system 150 may receive from a third computing system mapping data 122 describing an association between the one or more individuals of encrypted online interaction data 414 and the one or more individuals of encrypted offline action data 444. In some implementations, mapping data 122 describes an association between an identifier of online interaction data 112 and an identifier of offline action data 142. In some implementations, data processing system 150 queries the third computing system. For example, data processing system 150 may send identifier 114 associated with online interaction data 112 to the third computing system and receive the corresponding identifier 144 associated with offline action data 142.

At step 380, data processing system 150 may produce an aggregate output. Data processing system 150 may generate the aggregate output based on the correlation between online interaction data 112 and offline action data 142. In some implementations, executable code 250 includes instructions to determine what information is included in the aggregate output. The aggregate output does not include PII. At step 390, data processing system 150 may send the aggregate output to an output database. In some implementations, the output database is output database 160.

Figure 4:
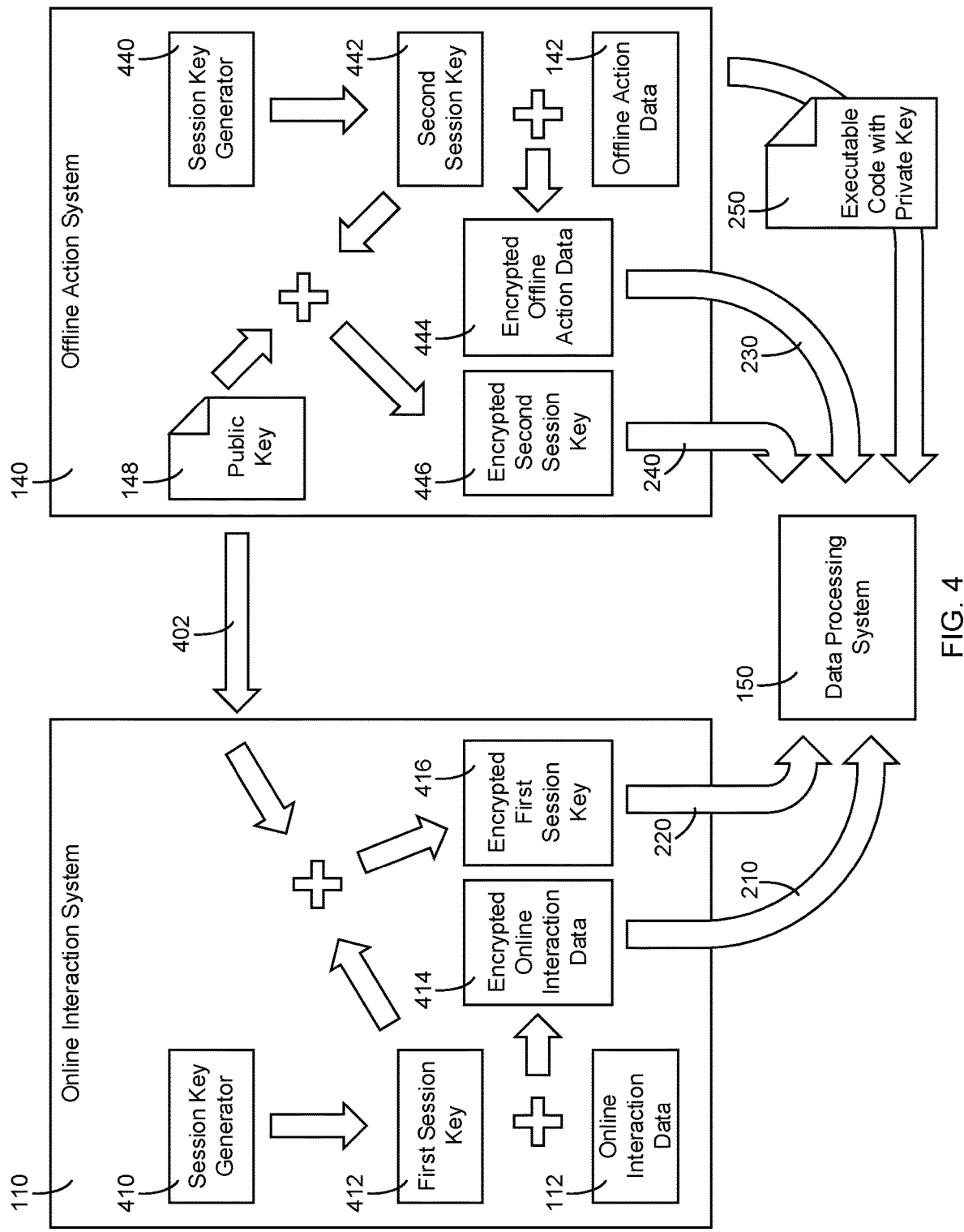
FIG. 4 is a diagram illustrating an encryption process to securely transfer data between the various entities of FIG. 1, according to an illustrative implementation.

Referring now to FIG. 4, a diagram illustrating an encryption process to securely transfer data between online interaction system 110, offline action system 140, and data processing system 150 is shown, according to an illustrative implementation. Online interaction system 110 may include online interaction data 112. Online interaction data 112 may be the online interaction data described in reference to FIG. 1. Similarly, offline action system 140 may include offline action data 142. Offline action data 142 may be the offline action data described in reference to FIG. 1. It should be understood, that while FIG. 4 is described in reference to online interaction system 110, offline action system 140, and data processing system 150, any processes may be implemented by a component or combination thereof (e.g., encryption circuit 116, encryption circuit 146, decryption circuit 156, etc.).

In some implementations, online interaction system 110 and offline action system 140 include session key generator 410 and 440 respectively. Session key generator 410 and 440 may generate first session key 412 and second session key 442 respectively. First session key 412 may be used to encrypt online interaction data 112. Second session key 442 may be used to encrypt offline action data 142. In some implementations, first session key 412 and second session key 442 are symmetric encryption session keys. For example, first session key 412 may be a 128-bit random integer generated by session key generator 410 using a 128-bit random initialization vector. In some implementations, first session key 412 and second session key 442 are limited use keys. For example, session key generator 410 and 440 may generate new session keys each time online interaction data 112 and/or offline action data 142 are sent to data processing system 150.

In some implementations, online interaction system 110 uses first session key 412 to encrypt online interaction data 112 to produce encrypted online interaction data 414. Similarly, offline action system 140 may use second session key 442 to encrypt offline action data 142 to produce encrypted offline action data 444.

In some implementations, first session key 412 and second session key 442 are encrypted prior to being transmitted to data processing system 150. Offline action system 140 may send (402) public key 148 to online interaction system 110. Online interaction system 110 may use public key 148 to encrypt first session key 412 to produce encrypted first session key 416. Similarly, offline action system 140 may use public key 148 to encrypt second session key 442 to produce encrypted second session key 446. Public key 148 may be an asymmetric encryption public key. In some implementations, offline action system 140 generates public key 148.

As discussed previously, encrypted online interaction data 414, encrypted first session key 416, encrypted offline action data 444, and encrypted second session key 446 may be sent (210-240) to data processing system 150. In some implementations, data is transferred between entities (e.g., online interaction system 110, offline action system 140, and data processing system 150, etc.) via a secure file transfer protocol (e.g., SSH file transfer protocol, etc.). Offline action system 140 may send executable code 250 including a private key to data processing system 150. Executable code 250 may include instructions to decrypt encrypted first session key 416, encrypted second session key 446, encrypted online interaction data 414, and/or encrypted offline action data 444. In some implementations, executable code 250 includes instructions to cause data processing system 150 to correlate online interactions of online interaction data 112 to offline actions of offline action data 142. In various implementations, executable code 250 includes instructions to cause data processing system 150 to generate aggregate output data indicating a number of transactions correlated to the online interactions.

In some implementations, executable code 250 is a binary. The private key may be an asymmetric encryption private key corresponding to the asymmetric encryption public key. For example, the private key may be part of a Rivest-Shamir-Adleman ("RSA") public-key cryptosystem. In some implementations, the private key is of a specified length (e.g., 2048-bits). In some implementations, offline action system 140 generates the private key. Executable code 250 may be secure such that a malicious outsider may not recover the private key if given access to executable code 250. For example, executable code 250 may be configured to only be operable when executed by data processing system 150.

Figure 5:
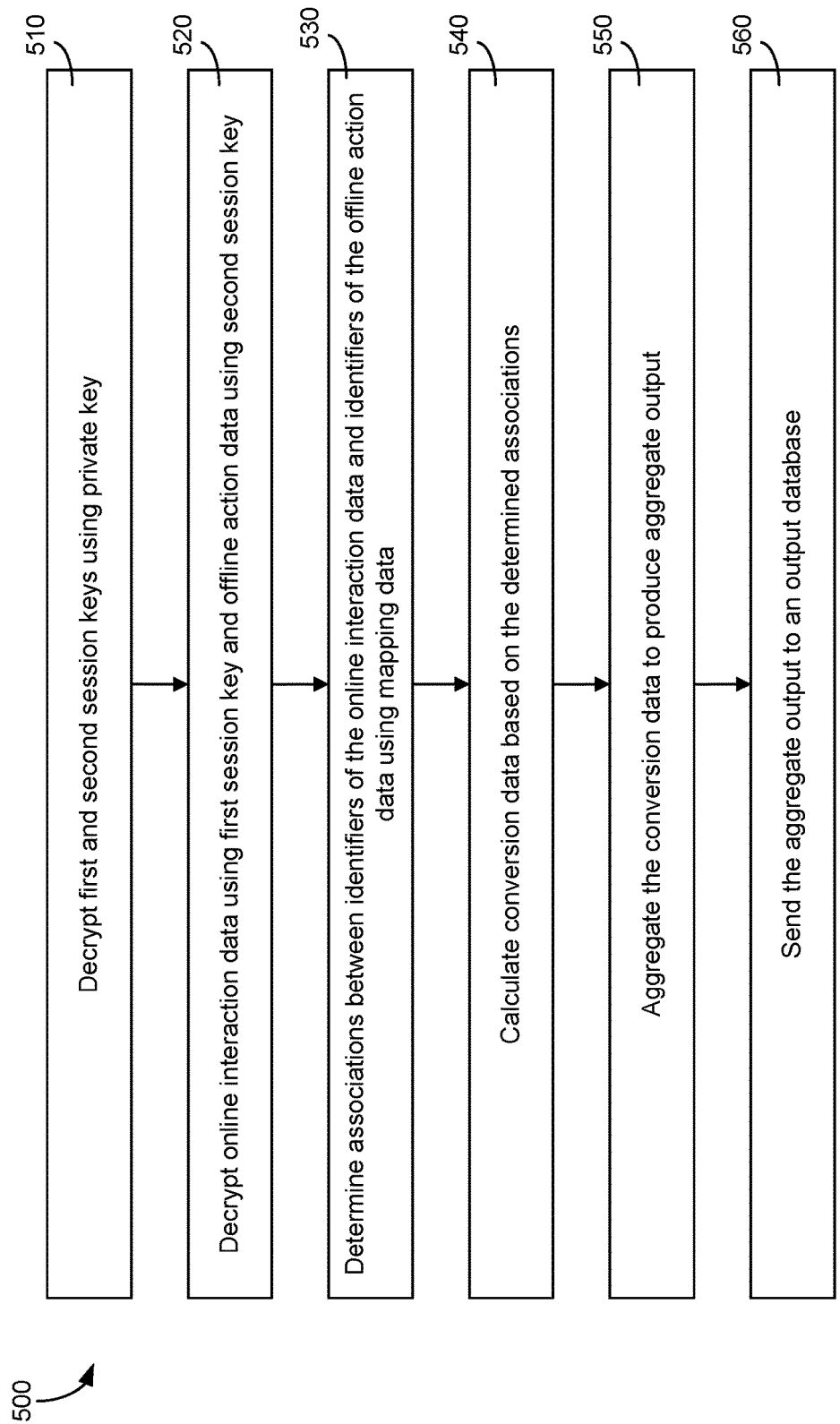
FIG. 5 is a flow diagram illustrating a method of securely generating aggregate conversion data, according to an illustrative implementation.

Referring now to FIG. 5, a flow diagram illustrating a method 500 of generating aggregate output data is shown, according to an illustrative implementation. In various implementations, method 500 is implemented by data processing system 150. In some implementations, method 500 is part of method 300. For example, method 500 may supplement and/or replace steps 360-390 of method 300. While method 500 is described in reference to data processing system 150, it should be understood that method 500 may be implemented by any computing device independent of online interaction system 110 and offline action system 140 that maintains PII anonymity and security.

At step 510, data processing system 150 may decrypt encrypted first session key 416 and encrypted second session key 446 using the private key. At step 520, data processing system 150 may decrypt encrypted online interaction data 414 using first session key 412 and may decrypt encrypted offline action data 444 using second session key 442. First session key 412 may be unique to encrypted online interaction data 414. Similarly, second session key 442 may be unique to encrypted offline action data 444. At step 530, data processing system 150 may correlate online interactions of online interaction data 112 to offline actions of offline action data 142. In some implementations, step 530 includes correlating an identifier associated with online interaction data 112 to an identifier associated with offline action data 142. Correlating online interaction data 112 to offline action data 142 may include using mapping data 122. For example, data processing system 150 may query bridge system 120 with an identifier associated with online interaction data 112 to receive an identifier associated with offline action data 142.

At step 540, data processing system 150 may generate conversion data based on the correlations between online interaction data 112 and offline action data 142. In some implementations, step 540 includes generating statistical measures describing the conversion data (e.g., mean, median, Q1, Q2, variance, etc.). At step 550, data processing system 150 may aggregate the conversion data to produce aggregate output data. The aggregate output data may include a sum of conversions (e.g., transactions, clicks, etc.), a sum of the value associated with each conversion (e.g., a dollar amount), and metadata. The metadata may include an indication of variance, average, and/or any other statistical measures. In some implementations, the contents of the aggregate output data are determined by executable code 250. At step 560, data processing system 150 may send the aggregate output data to an output location. In some implementations, the output location is output database 160. In some implementations, output database 160 is associated with online interaction system 110, as discussed in detail below with reference to FIG. 6.

Figure 6:
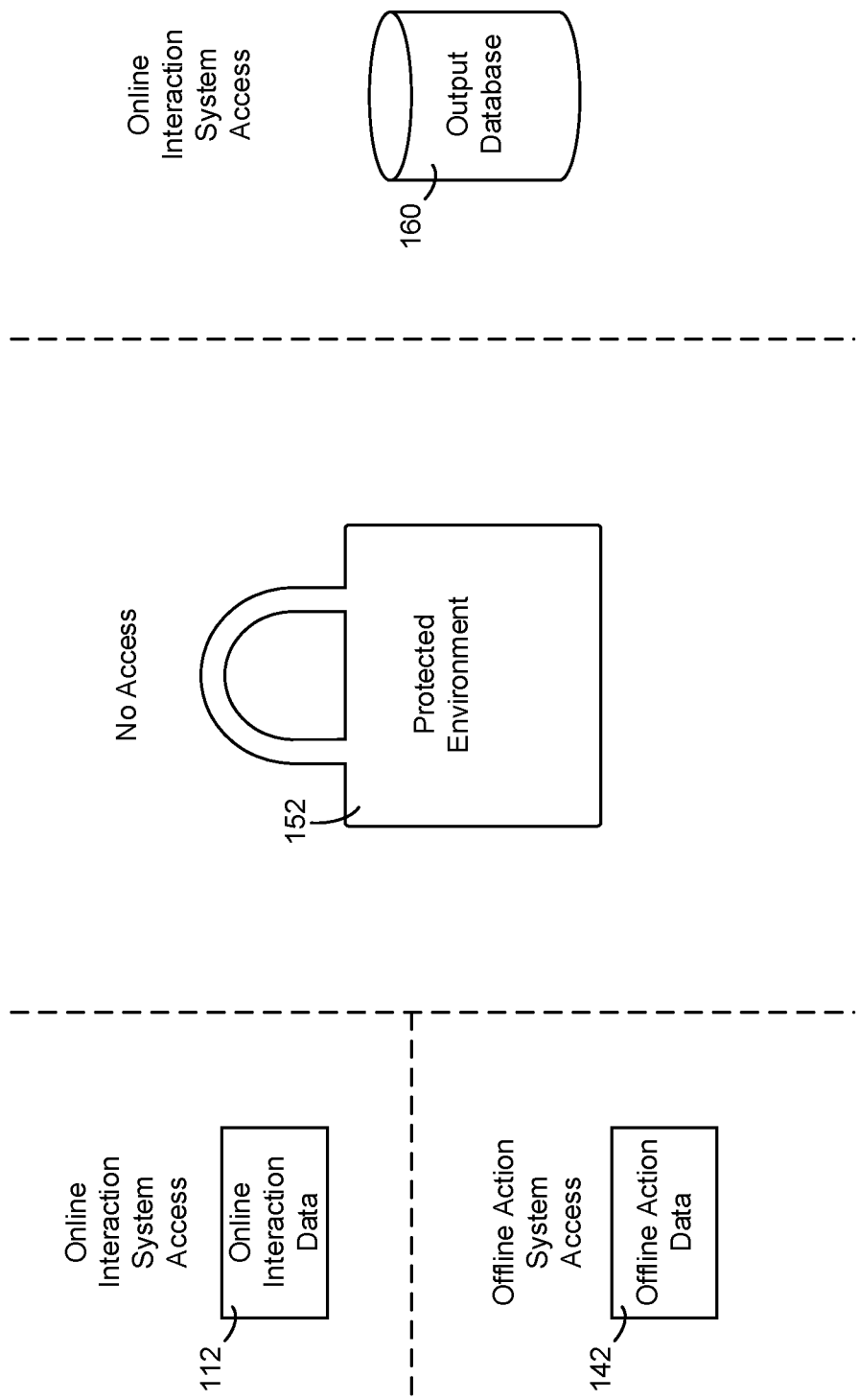
FIG. 6 is a diagram illustrating the access provided by the entities of FIG. 1, according to an illustrative implementation.

Referring now to FIG. 6, a diagram illustrating data security restrictions is shown, according to an illustrative implementation. As previously discussed, to maintain security of PII, online interaction data 112 and offline action data 142 should never be combined outside of a protected environment (e.g., protected environment 152). Online interaction system 110 produces online interaction data 112. Similarly offline action system 140 produces offline action data 142. However, online interaction system 110 may not have access to offline action data 142. Similarly, offline action system 140 may not have access to online interaction data 112. Encrypting online interaction data 112 and offline action data 142 ensures that online interaction system 110 cannot access offline action data 142 and offline action system 140 cannot access online interaction data 112, thereby ensuring the security of PII.

Additionally, encrypted online interaction data 414 and encrypted offline action data 444 may only be decrypted by data processing system 150 using executable code 250 with the private key. Therefore, even if a malicious outsider were to intercept encrypted online interaction data 414 and encrypted offline action data 444, the malicious outsider would not be able to recover online interaction data 112 or offline action data 142 to reveal PII. Furthermore, neither online interaction system 110 nor offline action system 140 may access the underlying information (e.g., online interaction data 112, offline action data 142) of data processing system 150.

In various implementations, executable code 250 facilitates customization of the aggregate output data. Offline action system 140 may provide executable code 250 and may change executable code 250 to determine what information is included in the aggregate output data. In various implementations, output database 160 is associated with online interaction system 110. Therefore, online interaction system 110 cannot produce the aggregate output without executable code 250 provided by offline action system 140 and offline action system 140 cannot access the aggregate output data in output database 160 without online interaction system 110. This isolation of data ownership facilitates the protection of PII.

Figure 7:
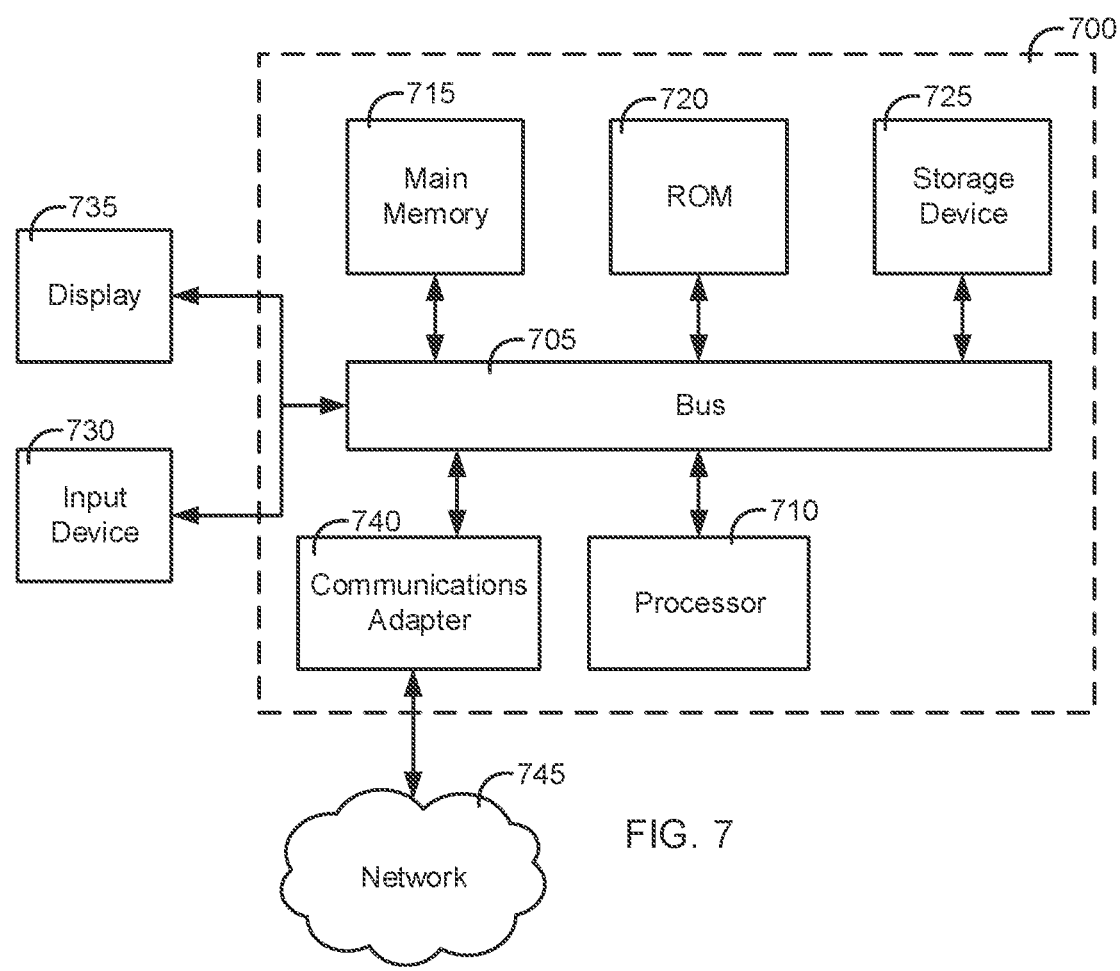
FIG. 7 is a block diagram of a computing system, according to an illustrative implementation.

FIG. 7 illustrates a depiction of a computing system 700 that can be used, for example, to implement an illustrative online interaction system 110, an illustrative offline action system 140, an illustrative data processing system 150, an illustrative bridge system 120, and/or various other illustrative systems described in the present disclosure. The computing system 700 includes a bus 705 or other communication component for communicating information and a processor 710 coupled to the bus 705 for processing information. The computing system 700 also includes main memory 715, such as a random access memory ("RAM") or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory ("ROM") 720 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In another implementation, the input device 730 has a touch screen display 735. The input device 730 can include a cursor control, such as a mouse, a trackball, or cursor direction keys, for communicating direction information and command selections to the processor 710 and for controlling cursor movement on the display 735.

In some implementations, the computing system 700 may include a communications adapter 740, such as a networking adapter. Communications adapter 740 may be coupled to bus 705 and may be configured to enable communications with a computing or communications network 745 and/or other computing systems. In various illustrative implementations, any type of networking configuration may be achieved using communications adapter 740, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative implementations, hard-wired circuitry may be used in place of or in combination with software instructions to implement illustrative implementations. Thus, implementations are not limited to any specific combination of hardware circuitry and software.

Although an example processing system has been described in FIG. 7, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Systems and methods of the present disclosure offer many benefits over existing systems. Correlating online interactions and offline actions from different entities requires a computing system have access to the online interaction data and the offline action data. For example, the online interaction system may send the online interaction data to the offline interaction data provider to correlate. However, when joined together, the online interaction data and offline action data may reveal PII regarding the individuals the data is associated with. It is undesirable to reveal PII.

Therefore systems and methods of the present disclosure offer improved security and flexibility by correlating online interaction data and offline action data in a protected environment. The present disclosure presents an improved encryption and computer architecture methodology to facilitate double-blind matching of data from different entities thereby improving security and conserving user privacy. Aggregate output produced by the systems and methods of the present disclosure are free of PII. Furthermore, systems and methods of the present disclosure allow for customization of the aggregate output. For example, different metrics may be identified and/or different output variables produced. Therefore, the systems and methods of the present disclosure offer customization and flexibility over existing solutions while maintaining data privacy and security.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable television channel, on a satellite television channel, or stored on a local hard drive. A set-top box ("STB") or set-top unit ("STU") may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving, at a first computing system from a second computing system, an encrypted first key and encrypted online interaction data encoding data indicating one or more online interactions with content, the encrypted online interaction data comprising a first identifier for each of the one or more online interactions;
receiving, at the first computing system from a third computing system, an encrypted second key and encrypted offline action data encoding data indicating one or more offline actions, the encrypted offline action data comprising a second identifier for each of the one or more offline actions;
receiving, at the first computing system from the third computing system, executable code comprising a third key; and
executing, by the first computing system, the executable code to:
decrypt the encrypted first key and the encrypted second key using the third key;
decrypt the encrypted online interaction data using the first key;
decrypt the encrypted offline action data using the second key;
correlate one or more of the offline actions in the offline action data to one or more online interactions in the online interaction data by determining the one or more of the second identifiers associated with the one or more of the first identifiers; and
generate aggregate data indicating a number of offline actions correlated to the online interactions.

2. The method of claim 1, further comprising transmitting the aggregate data to at least one of the second computing system or the third computing system without providing the decrypted online interaction data to the third computing system or the decrypted offline action data to the second computing system.

3. The method of claim 1, further comprising receiving, at the first computing system from a fourth computing system, mapping data associating one or more of the first identifiers with one or more of the second identifiers, wherein correlating the offline actions to the online interactions comprises determining the one or more of the second identifiers associated with the one or more of the first identifiers using the mapping data.

4. The method of claim 1, wherein the executable code is executed within a protected environment of the first computing system and the decrypted online interaction data and the decrypted offline action data is stored within the protected environment such that the decrypted online interaction data and the decrypted offline action data is inaccessible to a portion of the first computing system outside of the protected environment.

5. The method of claim 1, wherein the first key and the second key are shared keys and the third key is a private key, wherein the encrypted online interaction data and the encrypted offline action data are encrypted by symmetric encryption using the shared keys, and wherein the first key and the second key are encrypted by asymmetric encryption using the third key.

6. The method of claim 1, wherein generating the aggregate data using the executable code allows the third computing system to control characteristics of the aggregate data without exposing unencrypted action data to the third computing system.

7. The method of claim 1, wherein the one or more offline actions are offline transactions at one or more physical storefronts.

8. The method of claim 1, wherein the first computing system is a cloud cluster processing system.

9. A first computing system, comprising:
a memory having instructions stored thereon; and a processor configured to execute the instructions to:
receive, from a second computing system, a n encrypted first key and encrypted online interaction data encoding data indicating one or more online interactions with content, the encrypted online interaction data comprising a first identifier for each of the one or more online interactions;
receive, from a third computing system, an encrypted second key, executable code comprising a third key, and encrypted offline action data encoding data indicating one or more offline actions, the encrypted offline action data comprising a second identifier for each of the one or more offline actions; and
execute the executable code to:
  decrypt the encrypted first key and the encrypted second key using the third key;
  decrypt the encrypted online interaction data received from the first computing system using the first key;
  decrypt the encrypted offline action data received from the second computing system using the second key;
  correlate one or more of the offline actions in the offline action data to one or more online interactions in the online interaction data by determining the one or more of the second identifiers associated with the one or more of the first identifiers; and
  generate aggregate data indicating a number of offline actions correlated to the online interactions.

10. The first computing system of claim 9, the executable code further causing the processor to transmit the aggregate data to at least one of the second computing system or the third computing system without providing the decrypted online interaction data to the third computing system or the decrypted offline action data to the second computing system.

11. The first computing system of claim 9, the executable code further causing the processor to:
  receive, from a fourth computing system, mapping data; and
  correlate the offline actions to the online interactions by determining the one or more of the second identifiers associated with the one or more of the first identifiers using the mapping data.

12. The first computing system of claim 9, the first computing system further comprising a protected environment, wherein the decrypted online interaction data, and the decrypted offline action data are stored within the protected environment such that the decrypted online interaction data and the decrypted offline action data are inaccessible to a portion of the first computing system outside of the protected environment.

13. The first computing system of claim 9, wherein the executable code comprises a third key, wherein the first key and the second key are shared keys and the third key is a private key, wherein the encrypted online interaction data and the encrypted offline action data are encrypted by symmetric encryption using the shared keys, and wherein the first key and the second key are encrypted by asymmetric encryption using the third key.

14. The first computing system of claim 9, wherein generating the aggregate data using the executable code allows the second computing system to control characteristics of the aggregate data without exposing unencrypted action data to the second computing system.

15. The first computing system of claim 9, wherein the one or more offline actions are offline transactions at one or more physical storefronts.

16. A method, comprising:
  receiving, at a first computing system from a second computing system, an encrypted first key and encrypted online interaction data encoding data indicating one or more online interactions with content, the encrypted online interaction data comprising a first identifier for each of the one or more online interactions;
  receiving, at the first computing system from a third computing system, an encrypted second key and encrypted offline action data encoding data indicating one or more offline actions, the encrypted offline action data comprising a second identifier for each of the one or more offline actions;
  receiving, at the first computing system from the third computing system, executable code comprising a third key;
  receiving, at the first computing system from a fourth computing system, mapping data associating one or more of the first identifiers with one or more of the second identifiers; and
  executing, by the first computing system, the executable code to:
    decrypt the encrypted first key and the encrypted second key using the third key;
    decrypt the encrypted online interaction data using the first key;
    decrypt the encrypted offline action data using the second key;
    correlate one or more of the offline actions in the offline action data to one or more online interactions in the online interaction data by determining the one or more of the second identifiers associated with the one or more of the first identifiers using the mapping data;
    generate aggregate data indicating a number of offline actions correlated to the online interactions; and
    transmit the aggregate data to at least one of the second computing system or the third computing system without providing the decrypted online interaction data to the third computing system or the decrypted offline action data to the second computing system.

17. The method of claim 16, wherein the one or more offline actions are offline transactions at one or more physical storefronts.

18. The method of claim 16, wherein the first computing system is a cloud cluster processing system.

* * * * *

UNITED STATES PATENT AND TRADEMARK OFFICE
CERTIFICATE OF CORRECTION

| | | |
|---|---|---|
| PATENT NO. | : 11,356,428 B2 | Page 1 of 1 |
| APPLICATION NO. | : 16/759511 | |
| DATED | : June 7, 2022 | |
| INVENTOR(S) | : Margo Werner et al. | |

It is certified that error appears in the above-identified patent and that said Letters Patent is hereby corrected as shown below:

In the Claims

At Column 19, Line 2, "a n" should be -- an --.

Signed and Sealed this
Eighteenth Day of April, 2023

Katherine Kelly Vidal
*Director of the United States Patent and Trademark Office*